H. M. JOHNSTON.
COLLAPSIBLE TAP.
APPLICATION FILED MAR. 29, 1920.
1,381,841.
Patented June 14, 1921.
2 SHEETS—SHEET 2.
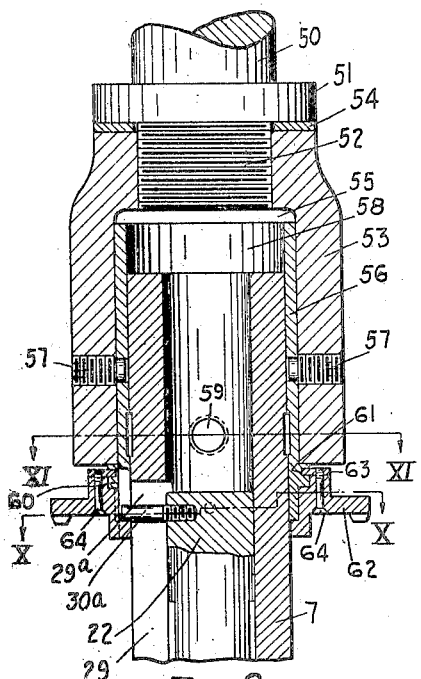
FIG. 9.
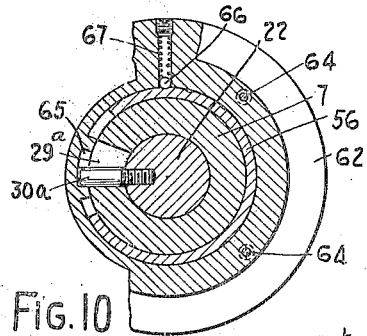
FIG. 10.
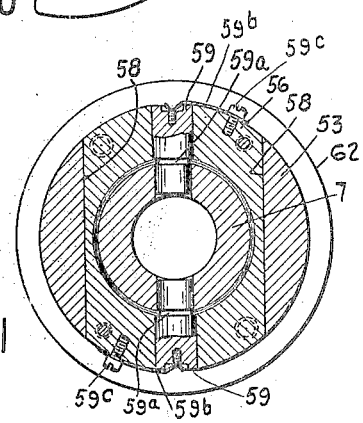
FIG. 11.
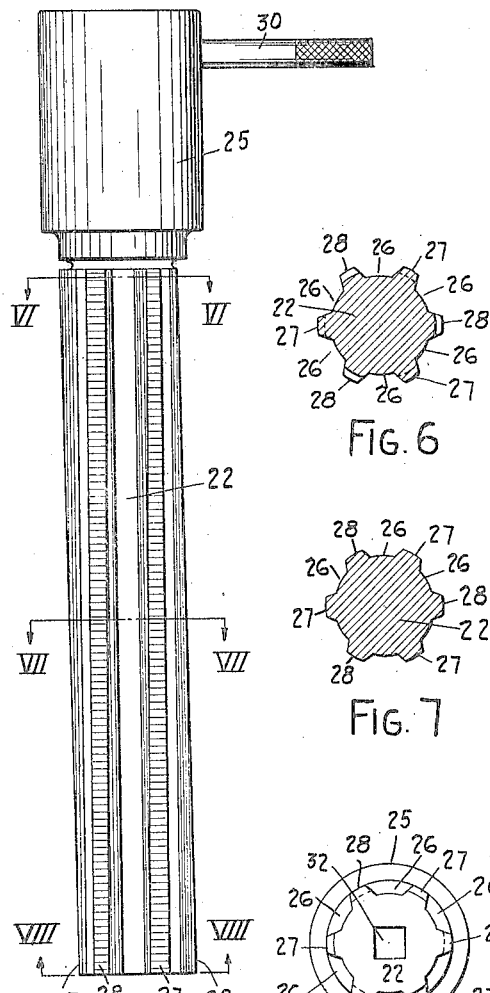
FIG. 5.
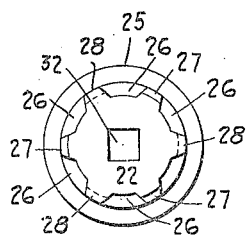
FIG. 6.
FIG. 7.
FIG. 8.
INVENTOR
H. M. Johnston
by D. Anthony Usina
his Attorney

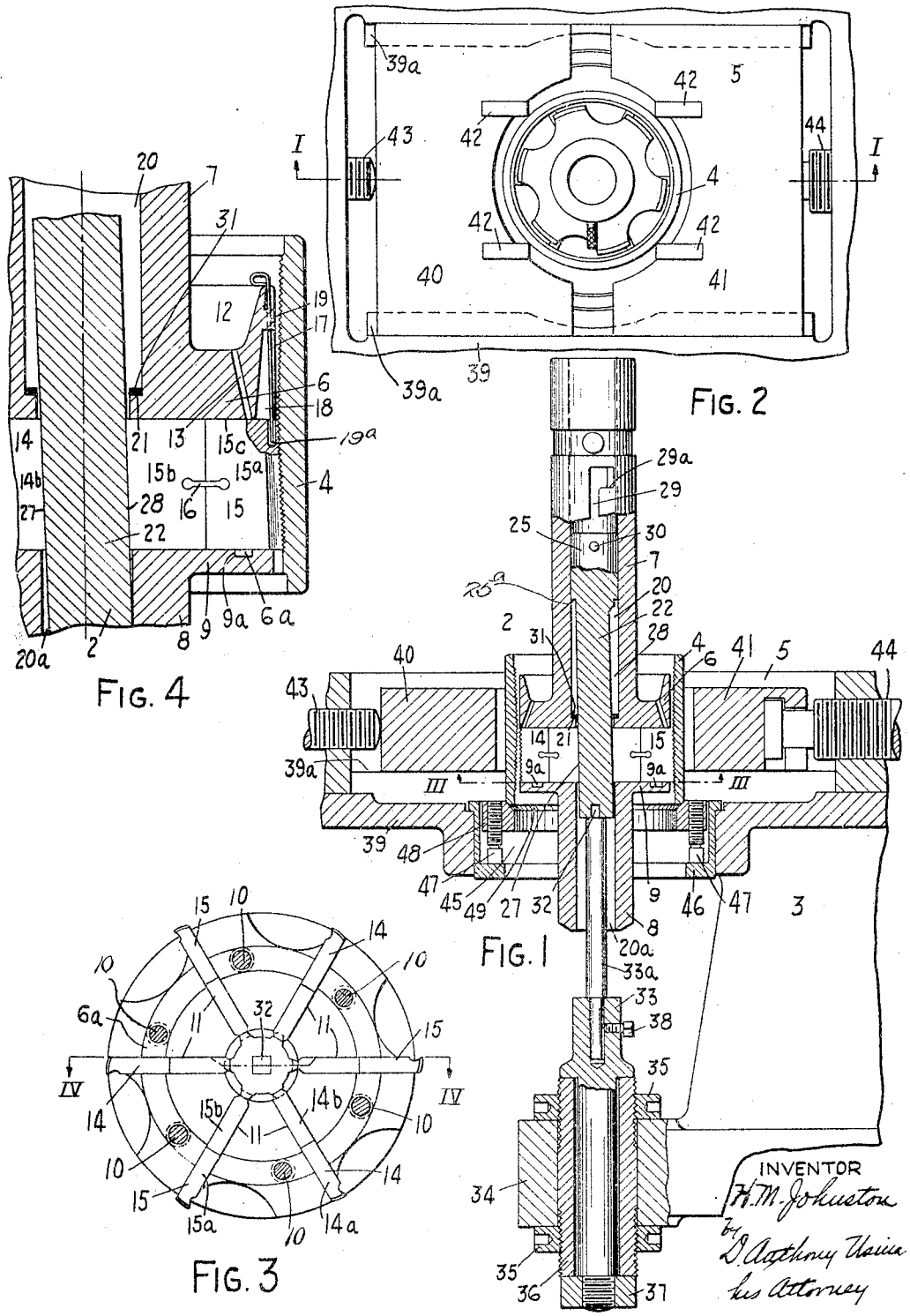

UNITED STATES PATENT OFFICE.

HARRY M. JOHNSTON, OF McKEESPORT, PENNSYLVANIA, ASSIGNOR TO NATIONAL TUBE COMPANY, OF PITTSBURGH, PENNSYLVANIA, A CORPORATION OF NEW JERSEY.

COLLAPSIBLE TAP.

1,381,841.   Specification of Letters Patent.   Patented June 14, 1921.

Application filed March 29, 1920. Serial No. 369,694.

*To all whom it may concern:*

Be it known that I, HARRY M. JOHNSTON, a citizen of the United States, and resident of McKeesport, in the county of Allegheny and State of Pennsylvania, have invented certain new and useful Improvements in Collapsible Taps, of which the following is a specification.

My invention relates to the class of tools known as taps and used for cutting internal threads, and more particularly to coupling taps used for cutting threads on the interior of pipe couplings, sockets, pipe fittings, and similar internally threaded articles.

One object of this invention is the provision of a collapsible tap having novel means whereby the chasers or thread cutters are moved into and maintained in thread cutting position during the "chasing" or thread cutting operations, and are collapsed or retracted at the completion of each thread cutting operation into position permitting the ready removal of the tap from the threaded article.

Another object of this invention is to provide a tap having a novel arrangement of chasers and chaser actuating members enabling a double taper internal thread to be cut on the article in a single forward movement of the tap through the article being threaded or "tapped."

Another object of this invention is to provide a tap having thread cutting chasers of improved construction whereby the chasers are made applicable for use in cutting threads having constant pitch, although of varying sizes or diameters.

A further object of my invention is the provision in a coupling tapping tool of improved means whereby the tap is utilized in handling the tapped couplings in the removal of the threaded couplings from the coupling tapping position.

A further object of the invention is the provision of a tap having novel means whereby a well is provided for storing and supplying lubricant to the chasers during the threading operations.

A still further object of the invention is the provision of a collapsible tap having the novel constructions, combinations, and arrangement of parts shown in the drawings, to be described in detail hereinafter, and to be particularly pointed out in the appended claims.

Referring now to the drawings, forming part of this specification, Figure 1 is a sectional side elevation showing a collapsible tap constructed and arranged for use in tapping pipe couplings and embodying my invention, the section being taken on the line I—I of Fig. 2.

Fig. 2 is a plan of the apparatus of Fig. 1, showing one form of gripping or clamping mechanism as supplied for use in rigidly holding the couplings in position during the tapping operations.

Fig. 3 is an inverted sectional plan on an enlarged scale, the section being taken on the line III—III of Fig. 1, showing the construction and relative arrangement of the radially movable chasers and the cam bar coacting therewith in maintaining the chasers of the tap in operative position during the thread cutting operations.

Fig. 4 is a sectional elevation on the irregular line IV—IV of Fig. 3, showing the arrangement and relative position of the chasers and cam-bar of the tap after completion of the first half and just prior to the completion of the second half of the thread cutting operation.

Fig. 5 is a side elevation of the fluted cam-bar by which the chasers are maintained in thread cutting position.

Fig. 6 is a transverse section of the cam-bar on the line VI—VI of Fig. 5.

Fig. 7 is a transverse section of the cam-bar on the line VII—VII of Fig. 5.

Fig. 8 is an end view of the lower end of the fluted cam-bar of Fig. 5 on the line VIII—VIII of Fig. 5.

Fig. 9 is a sectional side elevation of the upper end of the stem of my improved tap, showing a modification in the construction and arrangement of the cam-bar operating mechanism illustrated in Fig. 1.

Fig. 10 is a sectional plan on the irregular line X—X of Fig. 9.

Fig. 11 is a transverse section on the line XI—XI of Fig. 9.

In the accompanying drawings, my improved tap, which is designated generally by the numeral 2, is shown associated with a vertical spindle tapping machine 3, the tapping machine having a pipe coupling 4 clamped in adjusted position thereon by the coupling gripping mechanism or chuck 5.

The tap 2, as shown, comprises a head 6 having an integral hollow cylindrical stem 7. A hollow stem extension 8 having an integral flange 9 on one end is detachably fastened by cap screws 10 to the lower face or end of the head 6, and the annular groove 6ª and registering tongue 9ª on the opposite faces of the head 6 and flange 9 maintain the stem extension 8 in axial alinement with the head 6 and its stem 7.

The head 6 is provided with a series of radial grooves or slots 11 which are rectangular in cross-section. (Six grooves being shown). The slots 11 extend from the lower face of the head 6 to a point about midway in the height of the head. (See Figs. 1 and 4).

The number of slots corresponds to the number of chasers in the tap and obviously the number of chasers may be changed when found necessary or desirable. The periphery of the head 6 is fluted between the radial slots 11, as is shown in Fig. 3.

An annular depression is provided in the upper end of the head 6 to hold a supply of the oil or other lubricant used for lubricating the thread cutters or chasers of the tap, a hole 13 connecting the reservoir 12 with each of the radial slots 11. The upper face of the flange 9 on the stem extension 8 forms one side or end surface of the slots 11, the meeting faces of the head 6 and flange 9 being in the plane of the lower edge of the chasers.

Secured in each of the slots 11, so as to be radially adjustable therein, is one of the thread cutters or chasers 14 or 15, these chasers being arranged in two groups, with the chasers 14 alternating with the chasers 15 in forming the groups. The three chasers 14 forming one group are arranged to cut threads on the upper half of the length of the coupling 4, this thread tapering downwardly and inwardly within the coupling, and the three chasers 15 forming the other group are arranged to cut a thread on the lower half of the coupling which tapers downwardly and outwardly within the coupling (see Figs. 1ª and 4). The chasers of one group are arranged with respect to those of the other group, so that the tap will cut a thread which is continuous and of constant pitch throughout the length of the coupling.

The chasers 14 and 15 are made in sections, each chaser being divided lengthwise in two parts, or sections, which are separable, the two parts 14ª and 14ᵇ or 15ª, 15ᵇ of each chaser being detachably fastened together by means of a link 16 which is positioned in the registering transverse slots in the abutting edges of the chaser sections. (See Fig. 4.) By making the chasers in two separable parts, the outer sections 14ª, 15ª, or sections having V-threads on their outer edge, are made of high grade material such as high-speed alloy steel or other tool steel, while the inner or spacing sections 14ᵇ, 15ᵇ are made of ordinary plain steel, a much cheaper grade, and making the chasers in sections also permits of the outer sections 14ª, 15ª being used in threading couplings of different diameters, this result being attained by substituting inner sections 14ᵇ and 15ᵇ of greater or lesser width in assembling the chasers 14 and 15 in the tap 2.

Each of the chasers is yieldingly held against radial movement outward by means of a wire spring 17, these springs being arranged to yieldingly maintain the chasers in retracted or collapsed position, (or position shown by the chaser in Fig. 1). The springs 17, as will be seen in Fig. 4, are positioned in narrow grooves 18 in the periphery of the upper half of the width of the head 6, the axis of each groove being in alinement with that of one of the radial slots 11. The springs extend through holes 19 at or adjacent to one end of the grooves 18 and project into the holes 19ª in one end of the outer sections 14ª and 15ª of the chasers 14 and 15.

The hollow stem 7 of the tap has an axial hole or bore 20 and this bore is somewhat reduced in diameter near the lower end of the head 6 so as to form a shoulder or jog 21. The continuation 20ª of the bore in the stem extension 8 also is somewhat smaller in diameter than the bore 20. (See Fig. 1.)

Positioned within the bore 20, 20ª of the tap is a "star cam" 22 forming the means by which the chasers are moved radially and are maintained in operative position within the slots 11 during the thread cutting operations. The cam 22 is arranged to move lengthwise relative to the tap body in adjusting the tap and also to permit of the tap body's moving relative to the cam during the threading operations. This cam 22, as is shown in Figs. 1 and 5, has a cylindrical upper end 25 and fluted lower end, the six flutes 26 forming tapering cam faces 27, 28. Each one of these tapering surfaces 27 or 28 engages with the inner edge of a chaser in moving and holding the chasers in operative position, while the coupling is being tapped. The springs 17 yieldingly hold the chasers 14 and 15 in contact with the cam faces during the coupling tapping operations.

The tapering cam faces 27 and 28, as will be seen in Figs. 5 to 8, are arranged in two groups of three each, and the three faces 28 forming one group taper lengthwise in one direction relative to the axis of the cam, while the three faces 27, forming the other group, taper lengthwise in the opposite direction. The faces 27 forming one-half of the six cam faces, (six being an even number,) will be diametrically opposite the faces 28 on the cam, and the pairs of opposite faces 27, 28 will be parallel so as to taper lengthwise in the same direction relative to the axis of the star cam. (See Figs. 4, and 5 to 8.)

The wall of the stem 7 of the tap has a longitudinal slot 29 therein which extends lengthwise from near the lower end of the stem to the offset portion 29$^a$ forming its upper end, this offset portion 29$^a$ forming a seat, and a pin 30 having a threaded end screwed into a threaded hole in the upper end of the star cam 22 projects through the slot 29, and in one position is adapted to rest on or engage with the offset or seat 29$^a$. The cylindrical upper end of the star cam 22, as is shown in Figs. 1 and 5, is of a diameter to form a sliding fit in the bore 20 of the stem 7, to provide a bearing surface for the cam when the cam is moved lengthwise in the thread cutting operations or is rotated or moved angularly relative to the axis of the tap, as is done to position the six flutes 26 between the cam faces 27, 28 in alinement with the chasers 14 and 15, and permit the chasers to move inwardly in the slots 11 into retracted or collapsed position when the tap is to be removed from the tapped couplings. The star cam 22 slides lengthwise and also rotates within the bore 20 and the shoulder 25$^a$ on the cam is adapted to engage with the shoulder or jog 21 in the bore of the tap to limit, in one direction, the extent of lengthwise movement of the cam 22 within the hollow stem 7. An annular washer 31, made of leather, fiber, or similar material, forms a cushion which prevents distortion of the shoulders 21 and 26 by dropping the cam 22 within the bore 20 when using the tap.

The lower end of the star cam 22 is provided with a recess 32 which is rectangular in cross section, which forms means for the insertion of a wrench for positively turning the cam in the tap so as to collapse the chasers in an emergency, such as a chaser breaking or breakage of the teeth in one of the chasers when a coupling 4 is partially tapped, or similar reason.

A stop 33 which engages with and limits the downward movement of the star cam 22 is removably secured below the coupling holding chuck of the tapping machine. This stop, which projects upwardly within the bore 20$^a$ of the tap body engages with the lower end of the star cam 22 and determines its vertical position relatively to the coupling fastened on the tapping machine. The stop 33, by fixing the position of the cam 22, also determines the extent of radially outward movement of the chasers 14, 15 within the head of the tap. This stop is fastened on the arm 34 of the tapping machine frame so as to be vertically adjustable on the arm 34, being held in adjusted position by the nuts 35, 35 on the sleeve 36 to which the stop is fastened by the nut 37.

The removable stem 33$^a$ of the stop, which is made removable to provide stems of different lengths, is fastened on the stop by means of a set screw 38. It is to be understood that this stop mechanism is only one of numerous constructions which may be employed in connection with my improved tap to regulate lengthwise movement of the cam 22 and the radially outward movement of the chasers 14, 15 when actuated by the cam 22.

From the foregoing it will be clear that the stop 33 forms a convenient means for controlling downward movement of the star cam 22 and, through the medium of this cam, provides means for regulating the radially outward movement of the chasers which is necessary in cutting a double taper thread on the inner surface of the couplings 4.

The chuck 5 is provided on the tapping machine to hold the couplings 4 in position to be tapped, this chuck, as shown, being formed by the integral shelf 39 on the frame of the tapping machine 3, and having ways 39$^a$, 39$^a$ on which the chuck jaws 40, 41 slide in moving them horizontally toward and away from the axis of rotation of the rotating tap 2. The jaws 40 and 41 are provided with removable "steels" or inserts 42 which grip and hold the coupling 4 against rotative or other movement during the coupling tapping operation. An adjusting screw 43 forms means for moving and holding the jaw 40 in position to aline the couplings with the vertical axis or axis of rotation of the tap and an adjusting screw 44 moves and tightens the jaw 41 in holding engagement with the couplings 4.

The shelf 39 forming the housing for the chuck jaws 40, 41 has a circular opening into which a coupling supporting ring 45 is removably held. This ring has an inturned lip 46 on its lower edge and supported on this ring by adjusting screws 47 is an annular ring 48 having one inner edge 49 chamfered so as to center the couplings when placed thereon. By adjusting the screws 47 the annular ring 48 is raised or lowered so as to maintain the couplings in the desired vertical position relative to the clamping jaws of the chuck 5.

The tap may be secured in the lower end of the rotary tapping machine spindle 50 in any known and approved way. In the particular way shown, the vertical spindle 50 of the tapping machine has a collar 51 near its lower end, with a screw threaded projection 52 beyond the collar, and screwed on this threaded projection is a spindle extension 53. (See Figs. 9, 10, and 11.) A washer 54, made of metal or fiber or other suitable material, is provided between the adjacent faces of the collar 51 and spindle extension 53. The extension 53 has a transverse slot 55 in one end forming jaws into which a sleeve 56 stands, this sleeve being held in place therein by means of set screws 57. The upper end of the sleeve 56 has two flat sides 58, 58 which engages with the flat sides defining the width of the transverse slot 55 in the spindle extension 53 so that the sleeve 56 always rotates with the spindle. (See Fig. 11.)

The cylindrical stem 7 of the tap projects upwardly into the bore 58 of the sleeve 56, and is held therein by means of the pins 59, 59. (See Fig. 11). These pins 59, which are removable, have a peripheral groove $59^a$ therein, which weakens the shearing strength of the pins, so that when for any reason, the power applied by the spindle in rotating the tap exceeds a safe limit, the pins 59 will shear, and in this way avoid and prevent breakage or other damage to the tap itself. Flat springs $59^b$ are fastened by one end to the sleeve 56 by means of a cap screw $59^c$, and the other end of these springs engages with the outer end of the shear pins 59 to removably hold them in place. (See Fig. 11).

When tapping the smaller sizes of couplings or similar articles, no difficulty is found in lifting them by hand to remove the couplings from between the jaws of the chuck 5 at the completion of the tapping operations.

The larger sizes, however, require considerable exertion in lifting the couplings from between the jaws of the chuck 5, and to avoid the excessive amount of manual labor involved in lifting the couplings out of the chuck by hand, the modified apparatus of Figs. 9, 10, and 11, preferably will be provided.

As will be seen in Figs. 9, 10, and 11, the pin $30^a$ by which the star cam 22 is turned or oscillated in the bore of the stem 7, is shorter than the pin 30 of Figs. 1 and 5, so that the pin $30^a$ projects but a short distance beyond the peripheral surface of the stem 7 instead of far enough to form a handle.

The cylindrical lower end of the sleeve 56 is provided with a peripheral flange 60, with a circumferential groove 61 therein, and encircling the lower end of the sleeve 56 is a ring 62 arranged to rotate on and relative to the sleeve 56. An annular ring extension 63, which is split across its diameter is fastened to the ring 62 by cap screws 64, the inner edge of this extension 63 projecting into the groove 61 in the flange 60, so as to secure the ring in place on the sleeve.

The inner surface or bore of the ring 62 has a recess or groove 65 therein into which the outer end of the pin $30^a$ on the star cam 22 projects, and this pin is held in position by engagement with one end or the other of the recess 65, so as to prevent rotative movement of the star cam, when such movement is not required, the ring 62 being turned, either by hand or by a suitable turning mechanism.

The spring pressed ball 66 in the hole 67 in the ring 62 is arranged to engage notches in the periphery of the cylindrical lower end of the sleeve 56 (see Fig. 10), to yieldingly maintain the ring 62 against rotative movement relative to the other parts of the apparatus.

The operation of my improved tap will be readily understood. In assembling the tap for use the flange 9 of the stem extension 8 will be fastened to the lower end of the head 6 by the bolts 10. Chasers 14 and 15, built up of parts $14^a$, $15^a$ having threads of the desired pitch and parts $14^b$, $15^b$ of the desired width will be inserted in the radial slots 11 of the head 6 of the tap, and the springs 17 will be inserted in place as shown in Fig. 4. The tap, with the star cam 22 positioned within the bore 20 of the tap will then be fastened to the end of the rotary and lengthwise movable spindle 50 of the tapping machine. The stop 33 will be adjusted on the arm 34 so that when the lower end of the star cam 22 is in contact with the stop $33^a$ the cam faces 27 and 28 will be in position to move the chasers in the radial slots 11 of the tap head when the tap afterward descends into a coupling 4, to cut a thread therein.

A coupling is then positioned between the jaws of the gripping mechanism and the screws 47 are turned to raise or lower the ring 48 so as to bring the coupling into the right position vertically with respect to the operative lengthwise movement of the tap. The jaws 40, 41 are then caused to grip the coupling 4. The spindle 50 is then started to rotate and is moved downwardly by hand until the chasers are engaged with and commence to form a thread on the interior. The three chasers of the coupling 14 forming one of the two groups, will first engage with and cut a thread on the inner surface of the coupling from the upper end of the coupling to the middle of its length. As the inner edges of the chasers ride on the suitably tapered surfaces 27 between adjacent flutes 26 on the star cam 22, the chasers 14 now in engagement with the coupling 4 will travel in a path which is at an angle to the axis of rotation of the body, and will, in this way, cut an inwardly and downwardly tapering thread on the upper one-half of the coupling. While the first operating set of chasers 14 are in operation, the other set 15 will be held in collapsed and inoperative position by the springs 17 of which there is one for each chaser, and the necessary radially inward movement of the chasers 15 in the second set will be made possible because of the tapering surfaces 28 on the star cam that are in engagement therewith, these surfaces tapering in the opposite direction to the surfaces 27 on the star cam then in operative engagement with the chasers 14. As the head 6 moves downwardly relative to the star cam, this cam is held against downward movement by the adjusted stop 33 and the cam is positively caused to rotate with the tap by engagement of the pin 30 at the upper end of the cam with the narrow slot 29 in the side wall of the hollow stem 7.

As downward movement of the tap progresses, the cam faces 27 on the star cam permit of radially inward movement by the chasers 14, forming the set first operatively engaging the coupling, the springs 17 operating to yieldingly hold the chasers in contact with the cam faces 27, and at the same time the cam faces 28 cause the other set of chasers 15 to move radially outward. When the thread is formed on the upper one-half of the length of the coupling 4 the first operating set of chasers 14 have moved into inoperative position, and the other set 15 then continues to cut the thread on the other or lower one-half of the coupling, the threads on the chasers 14 and 15 being of the same pitch and being in alinement, the second set or groups will form a thread which is a truly helical continuation of the first formed thread and, as the tap continues to move downwardly the now acting chasers 15 will be moved radially outward by the cam faces 28 on the star cam 22. When the upper edges 15ᶜ of the chasers 15 are on the plane of the inner end 4ᵇ of the counterbore 4ᵃ in the coupling 4, the chasers 15 will be clear of the coupling and in readiness to be retracted. When this position is reached the pin 30 on the upper end of the star cam 22 will be opposite the enlarged end or offset 29ᵃ in the slot 29 of the stem 7, and as the tap rotates in a clock-wise direction, the star cam 22 will enter the offset in the slot, thus allowing the tap body to move rotatively with relation to the star cam so as to bring one of the flutes 26 between the adjacent cam faces opposite the inner edges of each of the radially movable chasers 14 and 15 so that the outer edges of both groups of the chasers will be retracted or moved radially inward by the springs 17 so as to be clear of the now threaded coupling and not offer any resistance to the tap being lifted vertically out of the coupling 4.

When threading the small sizes of couplings the tap is then moved upwardly until the lower end of the stem extension 8 is clear of the coupling. The chuck jaws 40, 41 are then opened to release the coupling 4, which is then removed manually and replaced by another, unthreaded coupling.

The star cam 22 is then moved manually by shifting the pin 30 on its upper end so as to turn the cam axially and again move the cam faces 27 and 28 into position opposite the inner edges of the chasers 14 and 15 to operatively bring the parts into position for the next coupling threading operation.

When tapping the large sizes of couplings, the cam 22 will not be shifted to bring the flutes or grooves 26 opposite the chasers 14 and 15 at the completion of the threading operation in the manner just described. Instead, after the chuck jaws 40, 41 are opened, the ring 62 will be turned to first bring the offset or jog 65 in position to support and lock the pin 30ᵃ in alinement with the slot 29. The spindle 50 will then be raised, and in so doing the chasers 15, being in expanded position, will engage with the threads on the tapped coupling and lift it out from between the jaws 40, 41, and to a sufficient height to insert an untapped coupling between the chuck jaws. The tapped coupling will then be lowered by moving the spindle 50 downwardly by means of the spindle reciprocating mechanism, until this tapped coupling rests on top of the new unthreaded one positioned between the chuck jaws. The cam is then moved, by turning the ring 62, to rotate the cam 22 and collapse the chasers 15, after which the spindle 50 is again raised until the stem extension 8 is above the upper edge of the threaded coupling. When this is done the threaded coupling is easily lifted from on top of the unthreaded one and the tapping operation is then repeated, as has been described.

Should for any reason the star cam stick and not turn it can be quickly moved by inserting a suitable tool in the squared recess 32 in the lower end of the cam 22, this being done while the tap is in its extreme lifted position or when the threading operation has been commenced by first removing the stop 33.

The advantages of my invention will be appreciated by those skilled in the art.

Many modifications in the construction and arrangement of the parts may be made within the scope of my invention as defined in the appended claims.

I claim:

1. A collapsible tap comprising a head having a tubular stem, said head having an axial opening in alinement with the bore of said tubular stem and having transverse slots extending radially inward from its periphery to the axial opening in said head, thread cutting chasers slidably positioned in said radial slots and having yielding means adapted to retract and hold the chasers in collapsed position within the slots, a star cam operatively secured within the alined axial openings in said head and stem, said star cam having faces adapted to engage with and hold the chasers in thread cutting position during relative lengthwise movement thereof, and means for turning the star cam axially relative to the tap head to disengage said cam faces from the chasers and permit inward radial movement of the chasers into collapsed position on said head.

2. A collapsible tap comprising a head having a tubular stem, said head having an axial opening in alinement with the bore of said tubular stem and having transverse slots extending radially inward from its periphery to the axial opening in said head, thread cutting chasers slidably positioned in said radial slots and having yielding means adapted to retract and hold the chasers in collapsed position within the slots, a star cam operatively secured with the alined axial openings in said head and stem, said star cam having longitudinally tapering faces adapted to engage with and hold the chasers in thread cutting position, means for causing relative lengthwise movement of the hard and star cam in the thread cutting operations to thereby cause the chasers to cut a taper thread, means for turning the star cam axially relative to the tap head to disengage the tapering cam faces from the chasers and permit inward radial movement of the chasers into collapsed position on said head, and means for preventing relative turning movement of the star cam and tap head during the thread cutting operations.

3. A collapsible tap comprising a head having a tubular stem, said head having an axial opening in alinement with the bore of said tubular stem and having transverse slots extending radially inward from its periphery to the axial opening in said head, thread cutting chasers slidably positioned in said radial slots and having yielding means adapted to retract and hold the chasers in collapsed position within the slots, a star cam operatively secured within the alined axial openings in said head and stem, said star cam having longitudinally tapering faces adapted to engage with and hold the chasers in thread cutting position, means for causing relative lengthwise movement of the head and star cam in the thread cutting operations to thereby cause the chasers to cut a taper thread, means for turning the star cam axially relative to the tap head to disengage the tapering cam faces from the chasers and permit inward radial movement of the chasers into collapsed position on said head, means for preventing relative turning movement of the star cam and tap head during the thread cutting operations, and adjustable means for holding said star cam against longitudinal movement in the thread cutting operations.

4. A collapsible tap comprising a head having a tubular stem, said head having an axial opening in alinement with the bore of said tubular stem and having transverse slots extending radially inward from its periphery to the axial opening in said head, thread cutting chasers slidably positioned in said radial slots and having yielding means adapted to retract and hold the chasers in collapsed position within the slots, a star cam operatively secured within the alined axial openings in said head and stem, said star cam having lengthwise tapering faces oppositely inclined adapted to engage with and maintain the chasers in thread cutting position, means for causing relative lengthwise movement of the head and star cam to thereby cause said chasers to cut oppositely tapering threads, means for turning the star cam axially relative to the tap head to disengage the oppositely tapering cam faces from the chasers and permit inward radial movement of the chasers into collapsed position.

5. A collapsible tap comprising a head having a tubular stem, said head having an axial opening in alinement with the bore of said tubular stem and having transverse slots extending radially inward from the periphery to the axial opening in said head, thread cutting chasers slidably positioned in said radial slots and having yielding means adapted to retract and hold the chasers in collapsed position within the slots, a star cam within the alined axial openings in said head and stem, said star cam being longitudinally movable relative to the head and chasers in the thread cutting operations and having faces adapted to engage with and hold said chasers in thread cutting position, means for turning the star cam axially relative to the tap head to disengage the cam faces from the chasers and permit inward radial movement of the chasers into collapsed position on said head, and means for connecting the star cam to said stem to move the cam lengthwise with the head in lifting the head.

6. A collapsible tap comprising a head having a tubular stem, said head having an axial opening in alinement with the bore of said tubular stem and having transverse slots extending radially inward from the periphery to the axial opening in said head, thread cutting chasers slidably positioned in said radial slots and having yielding means adapted to retract and hold the chasers in collapsed position within the slots, a star cam within the alined axial openings in said head and stem, said star cam being longitudinally movable relative to the head and chasers in the thread cutting operations and having faces adapted to engage with and hold said chasers in thread cutting position, means for turning the star cam axially relative to the tap head to disengage the cam faces from the chasers and permit inward radial movement of the chasers into collapsed position on said head, means for connecting the star cam to said stem to move the cam lengthwise with the head in lifting the head, and means for locking the cam on the head when the head and cam are lifted.

7. A collapsible tap comprising a head having a tubular stem, said head having an axial opening in alinement with the bore of said tubular stem and having transverse slots extending radially inward from the periphery to the axial opening in said head, thread cutting chasers slidably positioned in said radial slots and having yielding means adapted to retract and hold the chasers in collapsed position within the slots, a star cam within the alined axial openings in said head and stem, said star cam being longitudinally movable relative to the head and chasers in the thread cutting operations and having faces adapted to engage with and hold said chasers in thread cutting position, adjustable means for preventing lengthwise downward movement of the cam in the thread cutting operations, means for turning the star cam axially relative to the tap head to disengage the cam faces from the chasers and permit inward radial movement of the chasers into collapsed position on said head, means for connecting the star cam to said stem to move the cam lengthwise with the head in lifting the head, and means for locking the cam on the head when the head and cam are lifted.

8. A collapsible tap comprising a head having a tubular stem, said head having an axial opening in alinement with the bore of said stem and having transverse slots extending radially inward from the periphery to the axial opening in the head, thread cutting chasers slidably positioned in said slots and having yielding means adapted to retract and hold the chasers in collapsed position within the slots, a star cam operatively secured within the alined openings in said head and stem, said star cam having oppositely inclined lengthwise tapering faces adapted to engage with and maintain the chasers in thread cutting position, means for preventing lengthwise movement of the cam during the thread cutting operations, means for causing lengthwise movement of the head relative to the cam to thereby cut oppositely tapering threads with the tap, and means for causing a relative axial turning movement of the cam and head after completion of the threading operations.

9. A collapsible tap comprising a head having a tubular stem, said head having an axial opening in alinement with the bore of said stem and having transverse slots extending radially inward from the periphery to the axial opening in the head, thread cutting chasers slidably positioned in said slots and having yielding means adapted to retract and hold the chasers in collapsed position within the slots, a star cam operatively secured within the alined openings in said head and stem, said star cam having oppositely inclined lengthwise tapering faces adapted to engage with and maintain the chasers in thread cutting position, means for preventing lengthwise movement of the cam during the thread cutting operations, means for causing lengthwise movement of the head relative to the cam to thereby cut oppositely tapering threads with the tap, means for causing a relative axial turning movement of the cam and head after completion of the threading operations, and means for preventing axial turning movement of the cam and head at the completion of the threading operations.

10. A collapsible tap comprising a hollow and radially slotted head having collapsible thread cutting chasers, said chasers being slidably mounted in said radial slots, a tubular stem on one end of said head, with the bore thereof in axial alinement with said hollow head, an elongated slot in the wall of said stem, a fluted star cam slidably and rotatably mounted in said tubular stem and hollow tap head, said cam having taper surfaces engaging with the chasers, a stop forming means for holding said cam against lengthwise movement during the thread cutting operations, and means on one end of said cam extending into the elongated slot and arranged to engage the side walls of said slot to prevent relative axial turning movement of the cam and stem during relative lengthwise movement thereof, said elongated slot having an offset in one end arranged to receive said means and permit limited relative rotative movement of said fluted cam and said stem, to thereby bring said flutes opposite the ends of said radial chasers and permit radial inward movement of the chasers into collapsed position.

11. A collapsible tap comprising a hollow and radially slotted head having collapsible thread cutting chasers, said chasers being slidably mounted in said radial slots, a tubular stem in one end of said head, with the bore thereof in axial alinement with said hollow head, an elongated slot in the wall of said stem, a fluted star cam slidably and rotatably mounted in said tubular stem and hollow tap head, said cam having taper surfaces engaging with the chasers, a stop forming means for holding said cam against lengthwise movement during the thread cutting operations, means on one end of said cam extending into the elongated slot and arranged to engage the side walls of said slot to prevent relative axial turning movement of the cam and stem during relative lengthwise movement thereof, said elongated slot having an offset in one end arranged to receive said means and permit limited relative rotative movement of said fluted cam and said stem, to thereby bring said flutes opposite the ends of said radial chasers and permit radial inward movement of the chasers into collapsed position, and means for adjusting said stop.

12. A collapsible tap comprising a hollow and radially slotted head having collapsible thread cutting chasers, said chasers being slidably mounted in said radial slots a tubular stem on one end of said head with the bore thereof in axial alinement with said hollow head, a slot in the wall of said stem, a fluted star cam slidably and rotatably mounted in said tubular stem and hollow tap head, said cam having taper surfaces between the flutes thereof engaging with the chasers, an adjustable stop for holding said cam against lengthwise movement during the thread cutting operations, a pin on one end of said cam extending into the elongated slot and arranged to engage the side walls of the slot to prevent relative axial turning movement of the cam and stem during relative lengthwise movement thereof, said elongated slot having an offset in one end arranged to receive the pin in said cam and permit a limited relative rotative movement between said fluted cam and said stem, to thereby bring said flutes opposite the ends of said radial chasers and permit radial inward movement of the chasers into collapsed position, and a sleeve on said stem for locking said pin to prevent rotative movement between the cam and stem when opposite the offset in said slot.

In testimony whereof I have hereunto set my hand.

HARRY M. JOHNSTON.